US006290103B1

(12) United States Patent
Fraillon

(10) Patent No.: US 6,290,103 B1
(45) Date of Patent: Sep. 18, 2001

(54) COLLAPSIBLE CAP MECHANISM FOR SHIELDING PUMP ACTUATOR AND LIQUID MATERIAL-DISPENSING CONTAINER INCLUDING THE SAME

(75) Inventor: Patrick Fraillon, Larchmont, NY (US)

(73) Assignee: LIR-USA Manufacturing Co., Inc., Yaphank, NY (US)

( * ) Notice: Subject to any disclaimer, the term of this patent is extended or adjusted under 35 U.S.C. 154(b) by 0 days.

(21) Appl. No.: 09/394,851

(22) Filed: Sep. 13, 1999

Related U.S. Application Data

(60) Provisional application No. 60/100,822, filed on Sep. 15, 1998.

(51) Int. Cl.[7] .............................. B65D 88/54; G01F 11/06; G01F 11/30; G01F 11/36

(52) U.S. Cl. .............................. 222/321.1; 222/321.7; 222/321.9

(58) Field of Search .............................. 222/153.13, 321.7, 222/321.9, 321.1, 519; 215/28; 220/915, 724, 8

(56) References Cited

U.S. PATENT DOCUMENTS

| | | | | |
|---|---|---|---|---|
| 2,961,477 | * | 11/1960 | Slisz et al. | 220/8 |
| 3,073,886 | * | 1/1963 | Murphy | 220/8 |
| 3,348,740 | | 10/1967 | O'Donnell | 222/153 |
| 3,797,705 | | 3/1974 | Cooprider | 222/153 |
| 3,827,606 | | 8/1974 | Knickerbocker | 222/384 |
| 4,065,036 | | 12/1977 | Kirk, Jr. | 222/153 |
| 4,162,746 | | 7/1979 | Anderson et al. | 222/153 |
| 4,343,417 | | 8/1982 | Corsette | 222/153 |
| 4,434,915 | | 3/1984 | Kirk, Jr. | 222/153 |
| 4,889,262 | | 12/1989 | Toms | 222/153 |
| 5,038,967 | * | 8/1991 | Braun | 222/519 |
| 5,255,823 | * | 10/1993 | Tichy et al. | 222/153.13 |
| 5,388,730 | | 2/1995 | Abbott et al. | 222/153 |

* cited by examiner

*Primary Examiner*—David A. Scherbel
*Assistant Examiner*—Davis Hun
(74) *Attorney, Agent, or Firm*—Cooper & Dunham LLP

(57) ABSTRACT

For a liquid material dispenser having a neck and a pump actuator disposed outwardly of and depressible toward the neck, collapsible cap mechanism mountable on the neck to shield the pump actuator against accidental operation. The mechanism includes a cap that can be moved lengthwise of the neck between extended and collapsed (retracted) positions in which it respectively laterally surrounds and exposes the pump actuator.

9 Claims, 4 Drawing Sheets

COLLAPSIBLE CAP MECHANISM FOR SHIELDING PUMP ACTUATOR AND LIQUID MATERIAL-DISPENSING CONTAINER INCLUDING THE SAME

CROSS REFERENCE TO RELATED APPLICATION

This application claims the priority benefit, under 35 U.S.C. §119 (e) (1), of applicants' copending U.S. provisional application Ser. No. 60/100,822, filed Sep. 15, 1998, which is incorporated herein in its entirety by this reference.

BACKGROUND OF THE INVENTION

This invention relates to liquid material dispensers of the type having a neck with an external, manually depressible pump actuator mounted thereon. More particularly, it is directed to new and improved collapsible cap mechanism for shielding an external pump actuator, and to dispensers including such mechanism.

A common type of dispenser for liquid material, such as (for example) perfume, toilet water, or other cosmetic material, includes a necked bottle or like container and a pump with a manually depressible actuator projecting upwardly from the bottle neck for withdrawing and discharging quantities of the contained liquid. Typically, the actuator is a cylindrical button having a lateral orifice through which a jet or spray of the liquid is projected each time the actuator is pushed downwardly toward the bottle neck by the user's finger.

If the pump actuator of such a dispenser is left exposed, it may be vulnerable to inadvertent application of pressure and consequent undesired accidental discharge of material from the container. Accordingly, especially for transport of the container in a user's purse or pocket, it is customary to provide a separate, outer cap snapped or screwed over the neck of the container so as to shield the pump actuator. The outer cap, when in place, is effective to prevent unintended depression of the actuator; however, when removed it can become separated from the container and lost or misplaced, with resultant loss of protection against unintended actuation of the pump.

SUMMARY OF THE INVENTION

The present invention in a first aspect broadly contemplates the provision of collapsible cap mechanism for shielding a pump actuator mounted on, disposed upwardly of and depressible toward the neck of a liquid material dispenser. In this broad sense, the collapsible cap mechanism of the invention comprises a cap for laterally surrounding the actuator, the cap having a lower open end and an upper end with an orifice for passage of the actuator therethrough; means for mounting the cap on the neck for limited movement of the cap lengthwise of the neck between an upper, extended position in which the cap laterally surrounds the actuator and a lower, collapsed position in which the actuator is exposed; and manually operable means for imparting movement to the cap between these positions.

As used herein, terms such as "down" (or "lower") and "up" (or "upper") and the like will be understood to refer to directions (or positions) respectively toward (or closer to) and away from (or further from) the interior of the dispenser, generally along the geometric axis of the dispenser neck, i.e. considering the dispenser as standing upright with its neck oriented upwardly.

More particularly, in currently preferred embodiments, the collapsible cap mechanism of the invention includes a mounting member for securing the cap to the neck while permitting limited rotational and translational movement of the cap relative to the neck such that the cap is displaceable lengthwise of the neck between the aforesaid upper and lower positions, and a manually rotatable member, engaged by the mounting member so as to be retained on the neck against movement lengthwise of the neck, for imparting rotary movement to the cap; the cap, the mounting member and the rotatable member being mutually arranged such that rotation imparted to the cap by the rotatable member causes movement of the cap lengthwise of the neck between the upper and lower positions.

The mounting member, the cap and the manually rotatable member in these embodiments can be cylindrical members disposed concentrically around the neck. The cap and the mounting member can be respectively provided with at least one helical groove and at least one guide lug received in that helical groove such that rotation of the cap causes the cap to move lengthwise of the neck, while the manually rotatable member and the cap can be respectively provided with at least one straight groove extending lengthwise of the neck and at least one drive lug received in the one straight groove such that manual rotation of the rotatable member causes the cap to rotate while permitting movement of the cap lengthwise of the neck. Advantageously, the one straight groove has two opposed short transverse end portions respectively providing stop positions for the cap at each of the aforesaid upper and lower positions.

In a second aspect, the invention embraces the provision of a liquid material dispenser comprising a container for holding a quantity of liquid material, the container having a neck; and a pump actuator mounted on the neck, the actuator being disposed upwardly of and depressible toward the neck; wherein the improvement comprises manually operable collapsible cap mechanism mounted on the neck for shielding the pump actuator, including a cap supported externally of the neck for movement lengthwise of the neck between positions in which the cap respectively laterally surrounds and exposes the pump actuator, the cap having an upper end opening dimensioned to permit passage of the actuator therethrough.

In the mechanism and dispenser of the invention, the cap, when in the shielding position, affords effective protection against accidental depression of the pump actuator, while it permits ready operation of the actuator when collapsed (retracted) to expose the actuator. Since it is supported on the dispenser neck for movement between these positions, it does not become separated or lost from the dispenser.

Further features and advantages of the invention will be apparent from the detailed disclosure hereinbelow set forth, together with the accompanying drawings.

DETAILED DESCRIPTION

Figure 1:
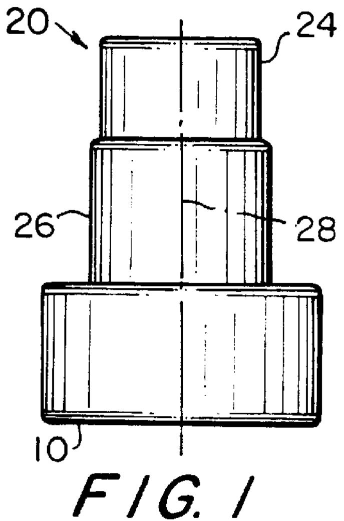
FIG. 1 is a side elevational view of a dispenser for liquid cosmetic material with collapsible cap mechanism embodying the present invention in a particular form, showing the cap in extended position.

The invention will be described as embodied in the liquid cosmetic material (e.g. perfume) dispenser illustrated in the drawings. In its broader aspects, however, the invention is not limited to use with or for any particular type of liquid material.

Referring to the drawings, the dispenser includes, as a container for liquid cosmetic material, a bottle 10 made of glass or substantially rigid plastic, having at its upper end an upstanding, generally cylindrical and axially rectilinear neck 11 through which the contained liquid is withdrawn for use. A pump mechanism is mounted on the neck by means of a generally cylindrical metal ferrule 12 crimped over an enlarged flange or lip portion of the neck. This mechanism includes a pump actuator 14 in the form of a generally cylindrical head or button disposed (externally of the container 10) at the upper end of a stem 16 projecting upwardly from the neck and ferrule, coaxially therewith. A discharge port 18 opens laterally outwardly through a side wall portion of the pump actuator and is connected to a tube (not shown) extending downwardly into the body of liquid within the container.

The actuator is manually depressible downwardly (against the restoring force of a spring, also not shown, under compression within the pump mechanism and urging the actuator upwardly) in a direction parallel to the geometric axis of the neck and ferrule. When the actuator is thus depressed, for instance by pressure of a user's finger, a quantity of liquid is forced from the interior of the container through the aforementioned tube and outwardly through the port 18 as a jet or spray, e.g. for deposit at a location, on a user's skin, at which the port is aimed.

The container and pump mechanism of the dispenser may be wholly conventional. Since such structures and devices are well known in the art, they need not be further described.

In accordance with the present invention, as a particular feature thereof, the dispenser includes manually operable collapsible cap mechanism 20 mounted on the container neck 11 for shielding the actuator 14 against inadvertent discharge-producing depression. That is to say, the cap mechanism protects the actuator from being accidentally pushed downwardly and causing undesired discharge of liquid from the port, but can be collapsed (while being retained on the container neck) so as to expose the actuator for operation.

The collapsible cap mechanism of the invention, in its illustrated embodiment, is constituted of three generally cylindrical annular elements of progressively larger radius, disposed in concentric relation to each other and surrounding the neck 11 of the container 10 coaxially therewith. The innermost one of these elements is a mounting member 22 for securing the mechanism 20 to the neck. The middle element is a cap 24 which can be moved between an upper, extended position and a lower, retracted position. The outermost element, surrounding the cap, is a manually rotatable member 26, exposed for grasping by the user's fingers for rotation (about an axis coincident with the geometric axis 28 of the container neck) to move the cap 24 between the aforesaid two positions. Each of these elements is conveniently a substantially rigid molded plastic member.

The mounting member 22, best seen in FIGS. 10–13, is a short cylinder having opposed open upper and lower ends. An annular flange 30 projects laterally outwardly from the lower end of the outer wall of the member 22, and one or more lugs 32 (hereinafter termed guide lugs) project laterally outwardly from the upper end of the outer wall of the member 22, the flange 30 and lugs 32 being molded integrally with the body of the member. Two such guide lugs 32, in diametrically opposed locations, are shown in FIGS. 10–13.

Also molded integrally with the body of member 22 are an annular flange 34 projecting inwardly from the inner wall of the member adjacent the upper end thereof, and several inwardly projecting nibs 36 (three being shown, 120° apart) formed at a central level on the inner wall. The member 22 snap fits over the ferrule 12 crimped on the enlarged upper end portion of the neck 11 of the container, with the flange 34 engaging the upper end of the ferrule and the nibs 36 seating under the lower end of the ferrule, as shown for example in FIG. 2. The dimensions of the member 22 are such that, when thus snap fitted, the member grips the ferrule and container neck sufficiently tightly so as not to be rotatable or longitudinally movable relative thereto.

Figure 17:
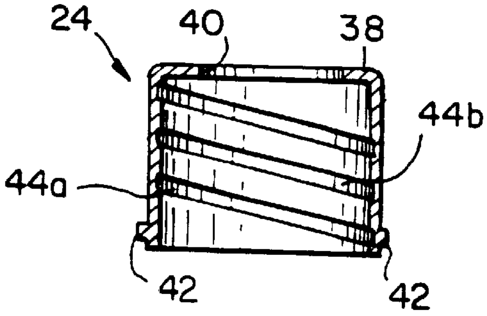
Figure 18:
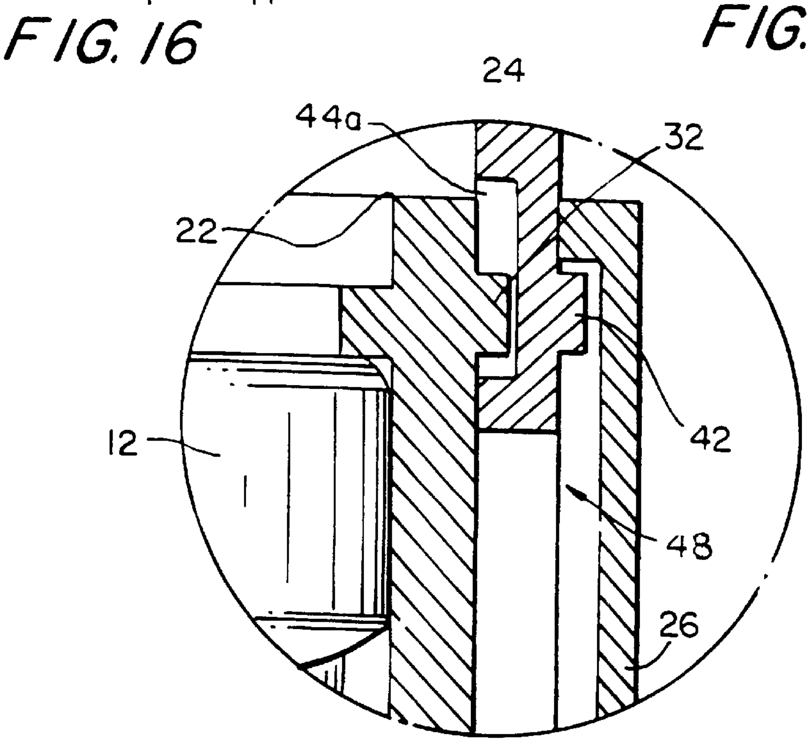
FIG. 18 is an enlarged fragmentary view, in elevational section, of the disposition of cooperating portions of the mounting member, manually rotatable member and cap element of the cap mechanism of FIG. 1.

The cap 24, best seen in FIGS. 14–17, is likewise a short cylindrical body, having an open lower end and an upper end or top 38 formed with a centered circular opening 40 larger in diameter than the actuator 14 so that the actuator can pass therethrough, i.e., as the cap moves between its extended and collapsed positions. One or more lugs 42 (hereinafter termed drive lugs), molded integrally with the cap, project laterally outwardly from the outer wall of the cap adjacent the lower end thereof, two such drive lugs (diametrically opposed) being shown in FIGS. 14–17. In addition, the inner wall of the cap is formed with one or more helical grooves, equal in number to the guide lugs 32 of the member 22, for respectively receiving the guide lugs; two such grooves, respectively designated 44*a* and 44*b*, are shown in FIG. 17. Each of these helical grooves extends from a lower to an upper location within the cap and is coaxial with the container neck when the cap mechanism 20 is mounted on the neck.

The manually rotatable member 26, best seen in FIGS. 6–9, is again a short cylindrical body, open at both its lower end and its upper end, with an integrally molded annular flange 46 projecting inwardly from the lower end of its inner wall. The inner wall of the member 26 is also formed with one or more straight grooves 48, equal in number to the drive lugs 42 of the cap, for receiving the drive lugs. Each of these straight grooves is aligned parallel to the axis of the cylindrical member 26 and has short oppositely laterally extending end portions 50*a*, 50*b* at its opposite ends to serve as stop locations for the drive lugs at the upper and lower limits of movement of the cap as hereinafter explained. The straight portions of these grooves 48 extend vertically (parallel to the axis of the neck) when the cap mechanism is mounted on the container and the container is in the upright position.

Figure 4:
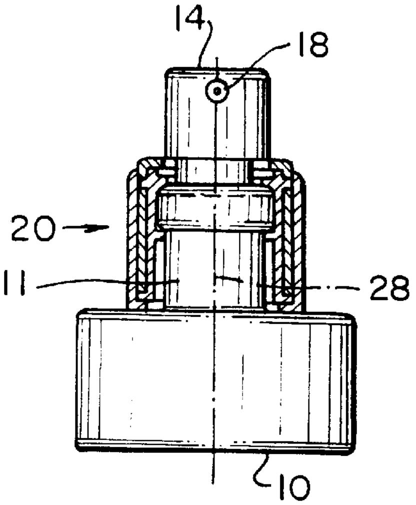
FIG. 4 is a view similar to FIG. 3 but showing the collapsible cap mechanism of the invention in elevational cross-section, in the collapsed position.
Figure 5:
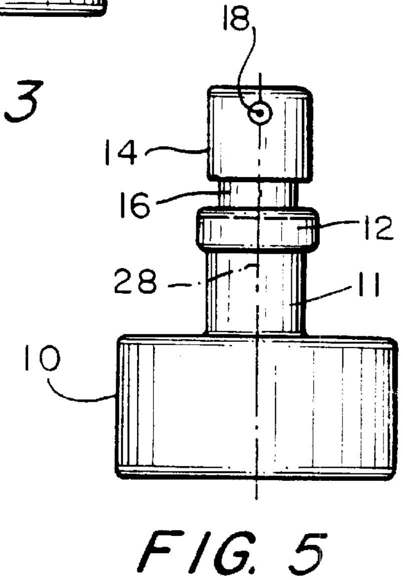
FIG. 5 is a side elevational view of the container and pump mechanism incorporated in the dispenser of FIG. 1.
Figure 6:
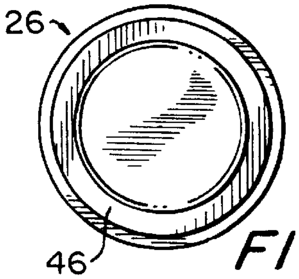
FIGS. 6, 7, 8 and 9 are, respectively, top plan, bottom plan, side elevational and side sectional views of the manually rotatable member of the cap mechanism of FIG. 1, FIG. 9 being taken along line 9—9 of FIG. 8.
Figure 7:
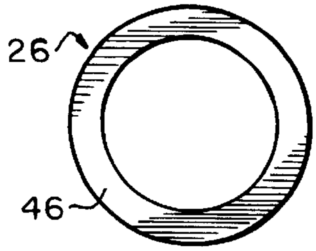
Figure 8:
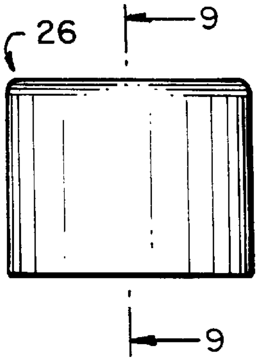
Figure 9:
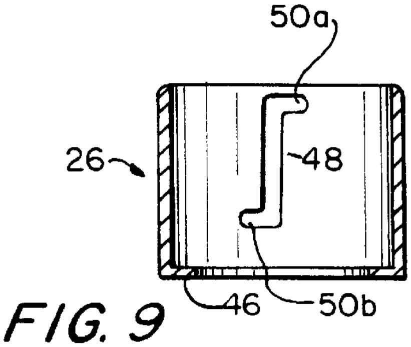
Figure 10:
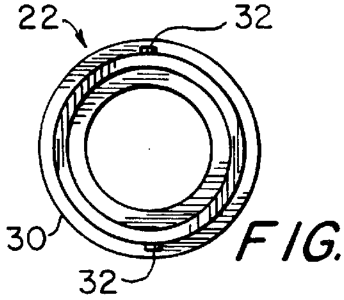
FIGS. 10, 11, 12 and 13 are, respectively, top plan, bottom plan, side elevational and side sectional views of the mounting member of the cap mechanism of FIG. 1, FIG. 13 being taken along line 13—13 of FIG. 12.
Figure 11:
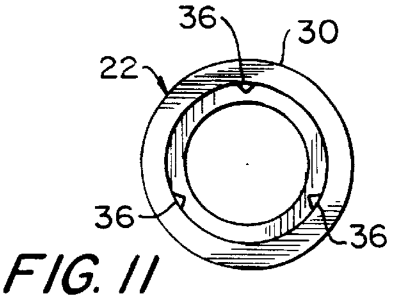
Figure 12:
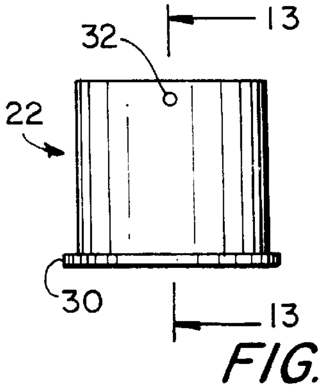
Figure 13:
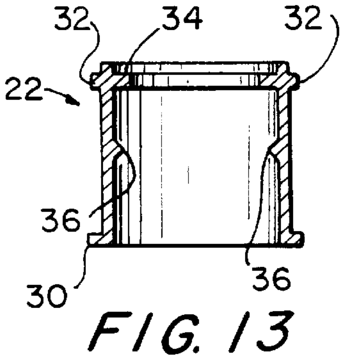
Figure 14:
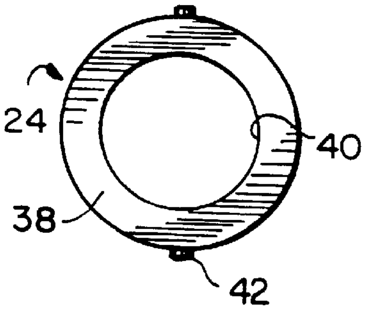
FIGS. 14, 15, 16 and 17 are, respectively, top plan, bottom plan, side elevational and side sectional views of the cap element of the cap mechanism of FIG. 1, FIG. 17 being taken along line 17—17 of FIG. 16.
Figure 15:
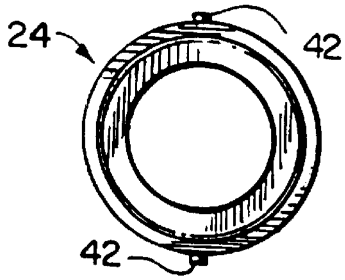
Figure 16:
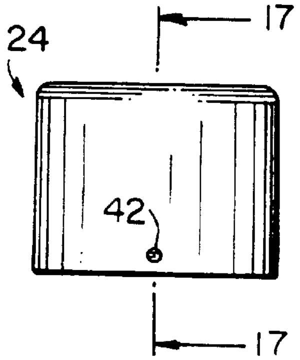

The three elements of the cap mechanism are assembled together before the mechanism is mounted on the container neck, their assembled relation being illustrated for example in FIG. 4. The cap 24, larger in radius than the mounting member 22, is fitted over the mounting member such that the guide lugs 32 projecting from the upper end of the mounting member are respectively received in the helical grooves 44*a* and 44*b*, the cap being able to move both rotationally and longitudinally relative to the mounting member to the extent permitted by engagement of the guide lugs 32 with the edges of grooves 44*a* and 44*b*. The assembled member 22 and cap 24 are then inserted into upper end of the manually rotatable member 26, which is larger in radius than the cap, care being taken to insert the cap drive lugs 42 into the respective straight grooves 48 of the manually rotatable member; the dimensions of the outwardly projecting lower flange 30 of the member 22 and the inwardly projecting lower flange 46 of the member 26 are such that the flange 46 underlies (lies below, i.e. downwardly of) and interferingly engages the flange 30. Finally, the assembled cap mechanism is pressed down over the container neck 11 until the nibs 36 snap into place below the ferrule, the member 22 having sufficient resilience to permit this snap-fitting insertion of the upper end of the neck into it.

In the mounted cap mechanism, the mounting member 22 is anchored against both longitudinal and rotational movement relative to the container neck 11 by its tight snap-fitting engagement with the ferrule 12 on the neck. The rotatable member 26 is retained against movement lengthwise of the neck by the interfering engagement of its flange 46 with the flange 30 of mounting member 22 and with the shoulder 52 of the container; however, it is free to rotate, relative to the member 22 and the neck 11, about the axis of the neck, and since it is located on the exterior of the mechanism, it can readily be thus rotated manually when grasped by a user's fingers.

Figure 2:
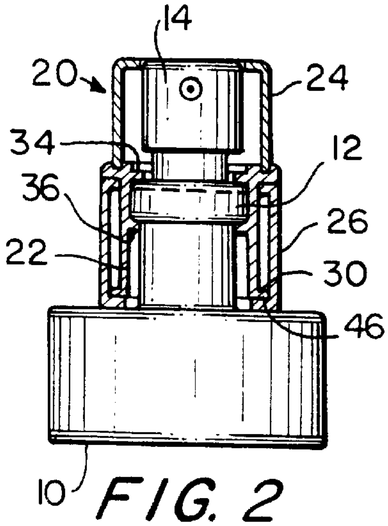
FIG. 2 is a view similar to FIG. 1 but showing the collapsible cap mechanism of the invention in elevational cross-section, in the extended position.

When the cap 24 is in the upper, extended position shown in FIGS. 1 and 2, its drive lugs 42 are respectively seated in the upper lateral stop portions 50*a* of the straight grooves 48 of the rotatable member 26, and the guide lugs 32 of the member 22 are at the lower ends of the helical grooves 44*a* and 44*b* of the cap. Upon rotation of the member 26 by a user's fingers in a first direction, the side edge of the straight portion of each groove 48 is brought into engagement with its associated drive lug 42, forcing the cap to rotate with the member 26 relative to the member 22.

Figure 3:
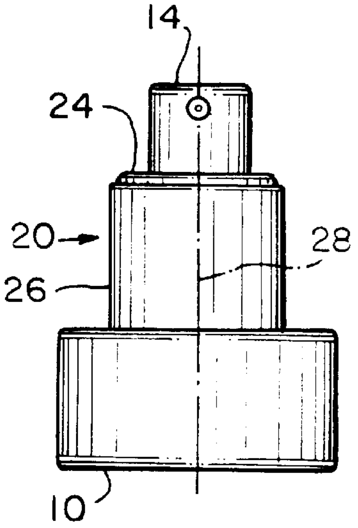
FIG. 3 is a view of the dispenser, similar to FIG. 1, illustrating the cap in collapsed (retracted) position.

As the cap is rotated, the engagement of the edges of its helical grooves 44*a* and 44*b* with the guide lugs 32 of the mounting member forces the cap to follow a helical path, moving not only rotationally but also downwardly, lengthwise of the container neck, until the cap reaches its lower, collapsed position shown in FIGS. 3 and 4. The vertical straight grooves 48 of the rotatable member accommodate this longitudinal movement of the cap. In the collapsed position of the cap, the drive lugs 42 seat in the lower stop portions 50*b* of the straight grooves 48 and the guide lugs 32 are at the upper extremities of the helical grooves 44*a* and 44*b*.

Manual rotation of the rotatable member 26 in the reverse direction effects reversely directed rotational and longitudinal motion of the cap relative to the container neck, causing the cap to rise from its lower, collapsed position (FIGS. 3 and 4) to its upper, extended position (FIGS. 1 and 2).

Figure 19A:
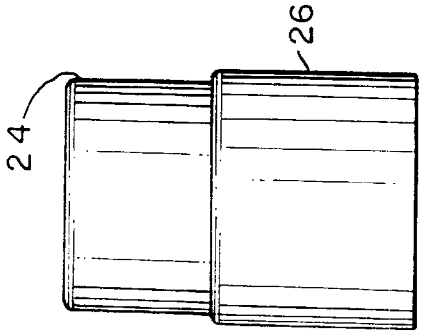
FIGS. 19A, 19B, 19C and 19D are simplified side elevational views illustrating successive stages of operation of the cap mechanism and pump actuator in the use of the dispenser of FIG. 1.
Figure 19B:
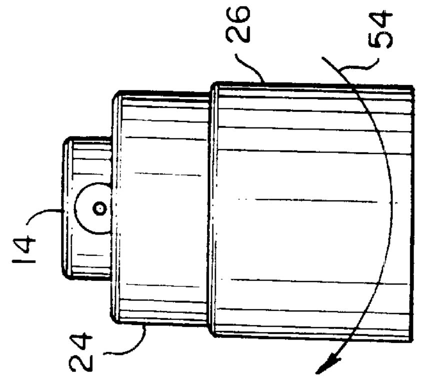
Figure 19C:
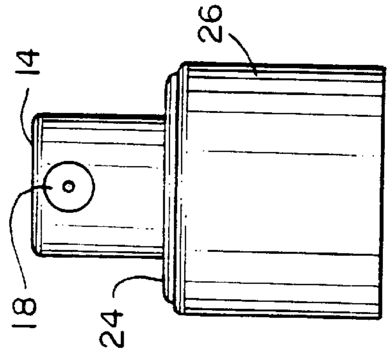
Figure 19D:
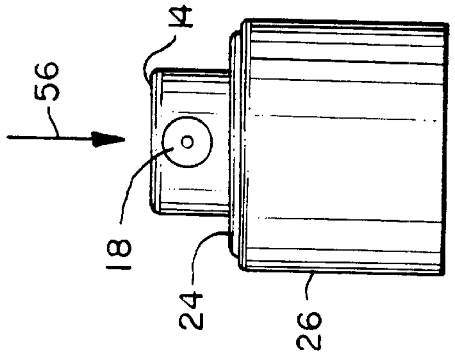

At the extended position, as seen in FIGS. 1, 2 and 19A, the cap 24 completely laterally surrounds the pump actuator 14, shielding the actuator from being inadvertently depressed downwardly and thereby preventing accidental discharge of liquid from the dispenser. As the rotatable member 26 is progressively turned in the direction of arrow 54 (FIG. 19B), the cap progressively collapses, descending to its lower, collapsed position (FIG. 19C) so as to fully expose the pump actuator for use; i.e., the actuator progressively emerges through the opening in the top of the cap, which permits free downward movement of the cap around the actuator. When the cap is fully collapsed, the actuator can be manually depressed in the direction of arrow 56 (FIG. 19D), causing discharge of a jet or spray of fluid from the port 16 for application as desired.

Whether extended or collapsed, the cap is always secured to the container neck; hence, unlike a separate cap or cover, it cannot become lost or misplaced during use of the pump, but is always available to shield the actuator by a simple rotary manipulation of the member 26. The stop portions 50*a* and 50*b* of the straight grooves 48 serve to retain the cap in each of its two (extended and collapsed) positions until it is deliberately moved by the user.

It is to be understood that the invention is not limited to the features and embodiments hereinabove specifically set forth, but may be carried out in other ways without departure from its spirit.

What is claimed is:

1. Collapsible cap mechanism for shielding a pump actuator mounted on a neck of a liquid material container, the actuator being disposed upwardly of and depressible toward the neck, said mechanism comprising:

(a) a cap for surrounding the actuator and neck, said cap having a lower open end and an upper end with an orifice for passage of the actuator therethrough;

(b) a mounting member for securing the cap to the neck while permitting limited rotational and translational movement of the cap relative to the neck such that the cap is displaceable lengthwise of the neck between an upper, extended position in which it laterally surrounds the actuator and a lower, collapsed position in which it exposes the actuator; and (c) a manually rotatable member, engaged by the mounting member so as to be retained on the neck against movement lengthwise of the neck, for imparting rotary movement to the cap; said cap, said mounting member and said rotatable member being mutually arranged such that rotation imparted to the cap by the rotatable member causes movement of the cap lengthwise of the neck between said upper and lower positions.

2. Collapsible cap mechanism as defined in claim 1, wherein said mounting member, said cap and said manually rotatable member are cylindrical members disposed concentrically around said neck.

3. Collapsible cap mechanism as defined in claim 2, wherein said cap and said mounting member are respectively provided with at least one helical groove and at least one guide lug received in said one helical groove such that rotation of the cap causes the cap to move lengthwise of the neck.

4. Collapsible cap mechanism as defined in claim 3, wherein said manually rotatable member and said cap are respectively provided with at least one straight groove extending lengthwise of the neck and at least one drive lug received in said one straight groove such that manual rotation of the rotatable member causes the cap to rotate while permitting movement of the cap lengthwise of the neck.

5. Collapsible cap mechanism as defined in claim 4, wherein said one straight groove has two opposed short transverse end portions respectively providing stop positions for said cap at each of said upper and lower positions.

6. A liquid material dispenser comprising:

(a) a container for holding a quantity of liquid material, said container having a neck; and (b) a pump actuator mounted on said neck, the actuator being disposed upwardly of and depressible toward the neck;

wherein the improvement comprises:

(c) manually operable collapsible cap mechanism mounted on the neck for shielding the pump actuator, including (i) a cap supported externally of the neck for movement lengthwise of the neck between positions in which the cap respectively laterally surrounds and exposes the pump actuator, the cap having an upper end opening dimensioned to permit passage of the actuator therethrough, (ii) a mounting member for securing the cap to the neck while permitting limited rotational and translational movement of the cap relative to the neck such that the cap is displaceable lengthwise of the neck between said positions, and (iii) a manually rotatable member, engaged by the mounting member so as to be retained on the neck against movement lengthwise of the neck, for imparting rotary movement to the cap; said cap, said mounting member and said rotatable member being mutually arranged such that rotation imparted to the cap by the rotatable member causes movement of the cap lengthwise of the neck between said positions.

7. A dispenser as defined in claim 6, wherein said mounting member, said cap and said manually rotatable member are cylindrical members disposed concentrically around said neck.

8. A dispenser as defined in claim 7, wherein said cap and said mounting member are respectively provided with at least one helical groove and at least one guide lug received in said one helical groove such that rotation of the cap causes the cap to move lengthwise of the neck.

9. A dispenser as defined in claim 8, wherein said manually rotatable member and said cap are respectively provided with at least one straight groove extending lengthwise of the neck and at least one drive lug received in said one straight groove such that manual rotation of the rotatable member causes the cap to rotate while permitting movement of the cap lengthwise of the neck; and wherein said one straight groove has two opposed short transverse end portions respectively providing stop positions for said cap at each of said positions.

* * * * *